UNITED STATES PATENT OFFICE.

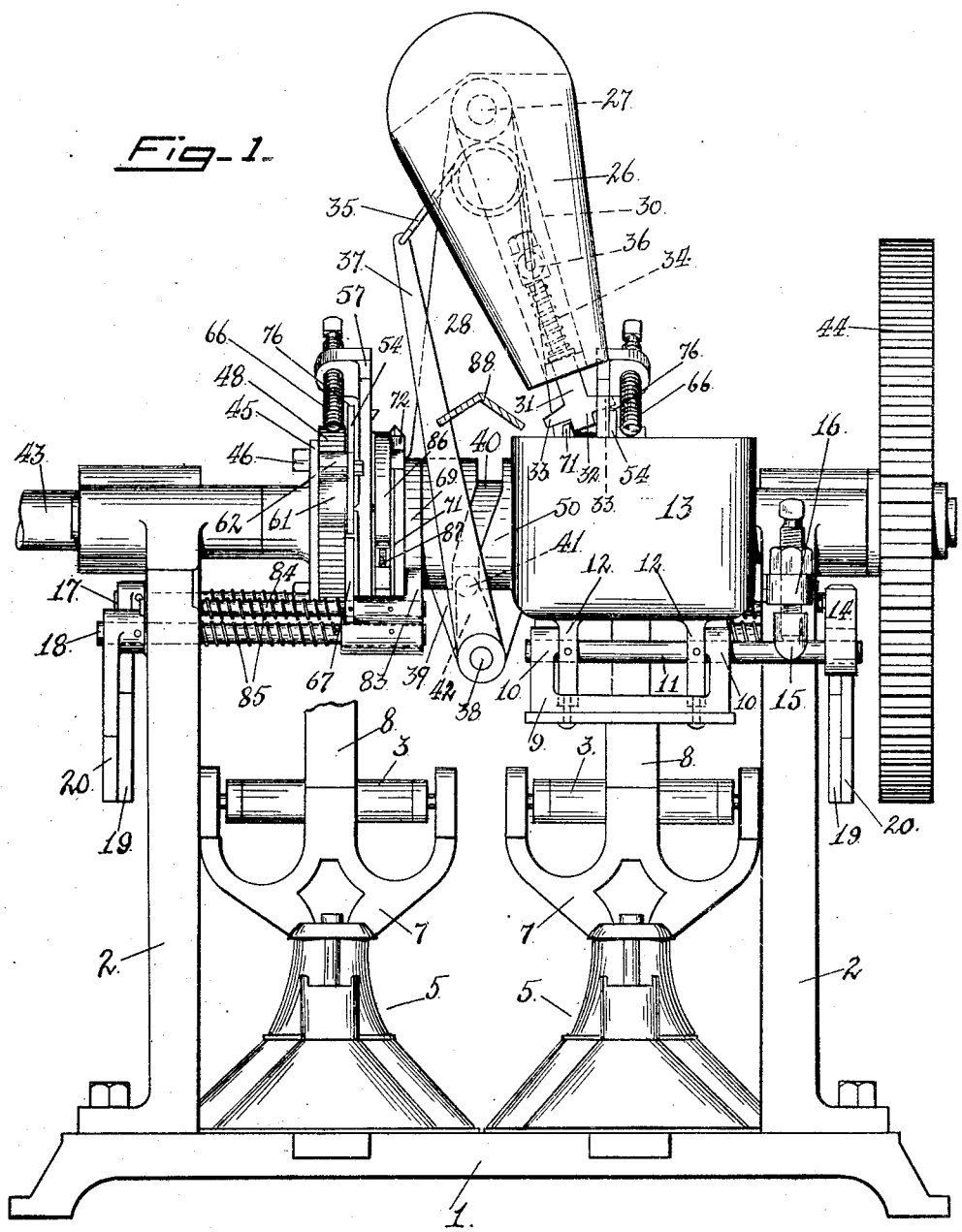

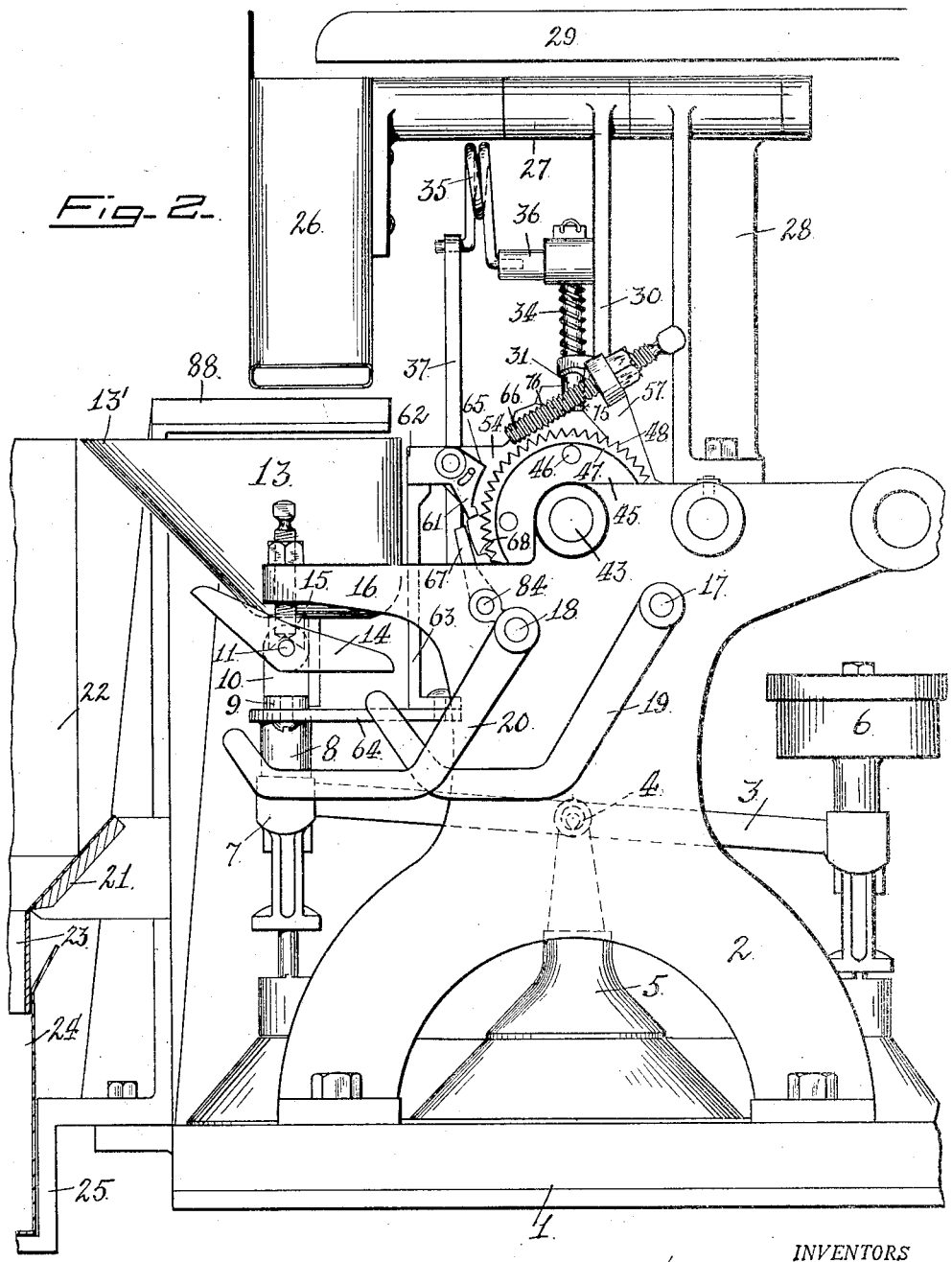

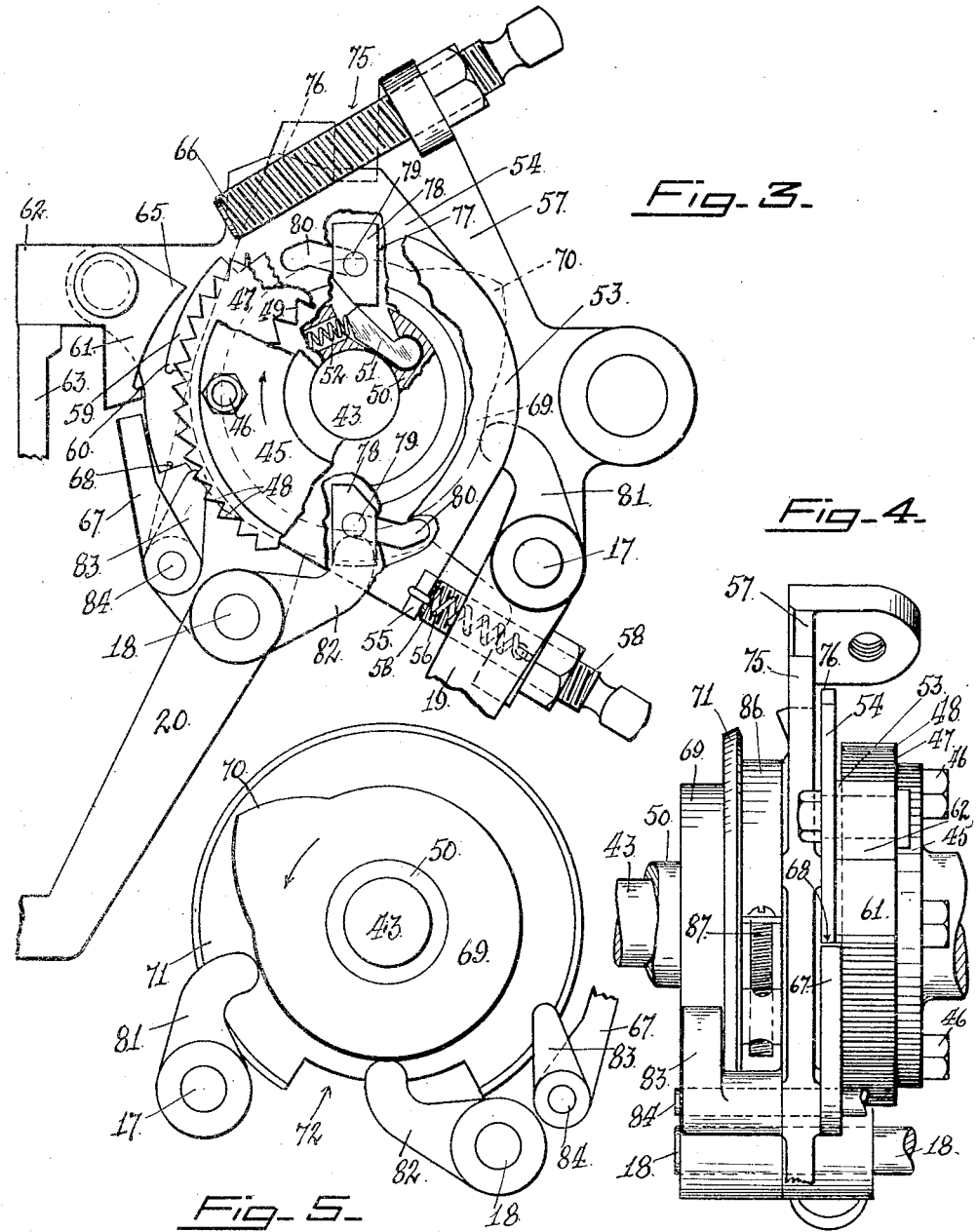

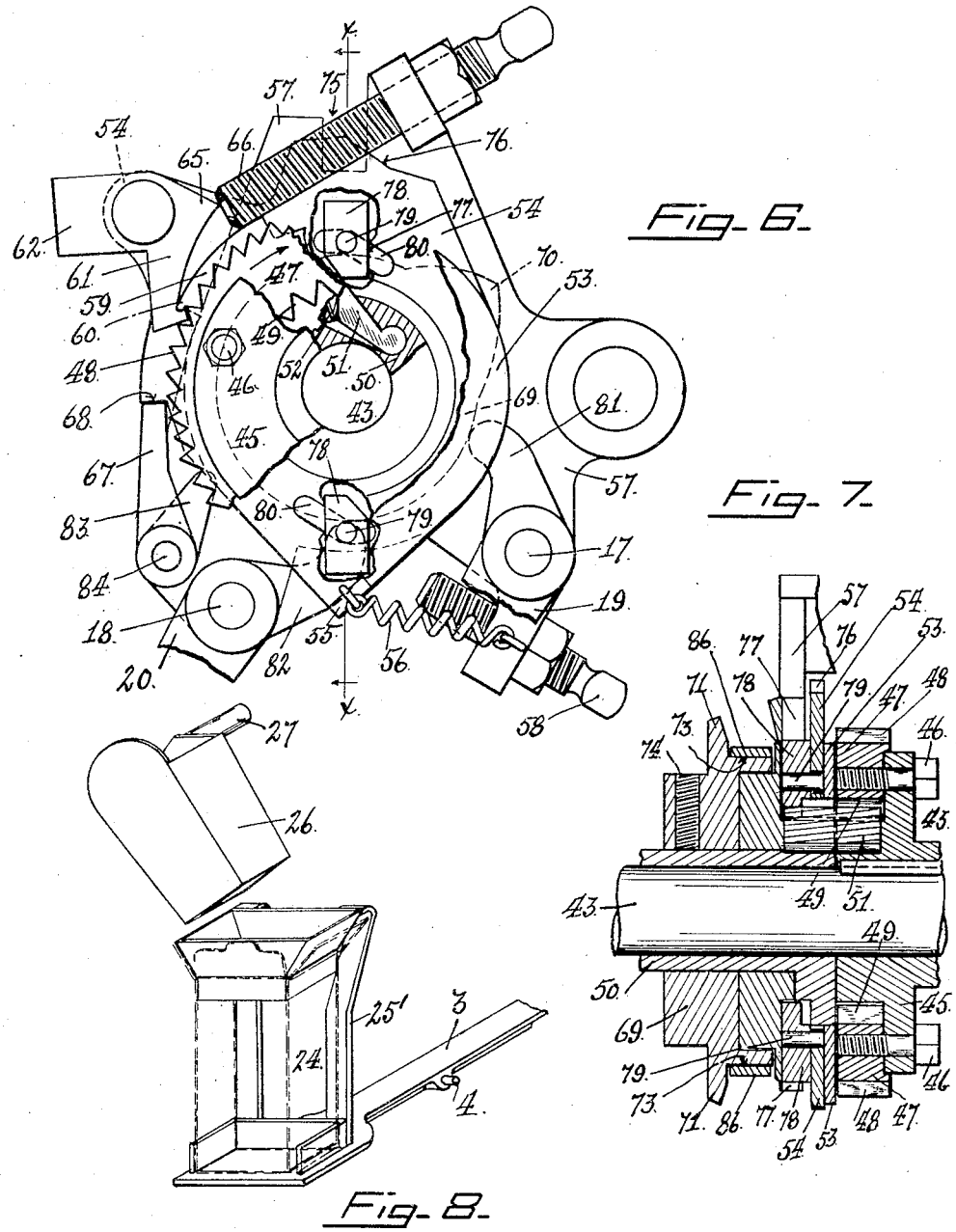

WILLIAM C. ANDERSON AND ALBERT R. THOMPSON, OF SAN JOSE, CALIFORNIA, ASSIGNORS TO ANDERSON-BARNGROVER MFG. CO., OF SAN JOSE, CALIFORNIA, A CORPORATION OF CALIFORNIA.

WEIGHING-MACHINE.

1,190,364. Specification of Letters Patent. Patented July 11, 1916.

Application filed December 16, 1915. Serial No. 67,170.

*To all whom it may concern:*

Be it known that we, WILLIAM C. ANDERSON and ALBERT R. THOMPSON, citizens of the United States, residing at San Jose, in the county of Santa Clara and State of California, have invented certain new and useful Improvements in Weighing-Machines, of which the following is a specification.

Our invention relates to that class of machines adapted for determining a given weight of material supplied to containers, such, for example, as food-products delivered to cartons. These machines embody, in one form or another, means for delivering the material, and means influenced or affected by the predetermined weight of material delivered, for automatically stopping the delivery. As heretofore practised the arrest of delivery has been due to a temporary cessation of the flow of the stream of material in the delivery means. This, with many materials is effective, but when the material is of a sticky or gummy nature, the accurate arrest of the flowing stream is a matter of some difficulty and not always practicable. Thus, when seeded raisins are fed to cartons in a weighing machine, it is very difficult on account of their sticky condition to stop and start their flow with sufficient accuracy to avoid overweight or waste of time or material or spilling of material and the consequent soiling of the machine and its surroundings. In some cases, where without stopping the flow of the material, the delivery means are automatically moved from one receiver to another, this movement is due to and is effected by the action of direct transmitting connections from the receivers themselves. But in machines of this type the disadvantage is that the movement of the delivery means, due solely to the movement of the receivers and directly transmitted therefrom, is neither accurate nor positive, especially when the predetermined weight is slight in comparison with the mass which it is intended to move, as, for example, the case mentioned of supplying cartons with seeded raisins. Our invention is especially applicable to this particular use, in that we contemplate the continuous and uninterrupted flow of the seeded raisins, by the expedient of a plural scale, the successive operation of each scale by the weight of the mass delivered, and the automatic adjustment of the delivery means, by an independent power device thrown into and out of action by the operation of the scales, to successively divert the stream of raisins to successive receivers, without arresting or interrupting the flow of said stream.

This is the essential object of our invention, and to this end our invention consists in the novel weighing machine which we shall now fully describe by reference to the accompanying drawings, in which—

Figure 1 is a front elevation of the machine, one of the weighing buckets being omitted. Fig. 2 is an end elevation, the driving gear being omitted. Fig. 3 is an end elevation, enlarged, of one set of operating mechanism, certain portions being broken away, showing the relation of the parts when the scale is in inoperative position. Fig. 4 is a side elevation of the mechanism shown in Fig. 3. Fig. 5 is an end elevation of the cam and cam followers, viewed in the reverse direction from Fig. 3. Fig. 6 is a view similar to Fig. 3, except that the parts are shown in the positions assumed immediately after the operating mechanism is actuated. Fig. 7 is a section taken in the direction of the arrows on the line $x$—$x$ of Fig. 6. Fig. 8 is a fragmentary perspective view to illustrate a modification in which the weighing buckets are omitted, the stream of material being fed directly to the cartons.

In the drawings and referring particularly to Figs. 1 and 2 thereof, the numeral 1 represents a suitably constructed base or bed plate, upon which are mounted two spaced upright supporting end plates 2. Mounted side by side upon the base 1 are two similar balance scales, each comprising a beam 3 fulcrumed at 4 upon a suitable support 5, and carrying at one end a weight 6 and at the other a yoke member 7 having an upwardly extended portion 8, which supports a superposed yoke member 9, in the arms 10 of which is journaled a transverse rod 11. The rod 11 has fixed upon it the two depending lugs 12 of a tiltable weighing bucket 13, and one of its ends extends out beyond the end plate 2, and carries thereon a double lever 14. A stop 15, adjustably mounted in an arm 16 of the end plate 2, engages the rod 11 to limit the upward travel of the bucket 13.

Each weighing bucket 13 has a dumping and righting mechanism associated therewith, comprising a pair of transverse rockshafts 17 and 18 projecting beyond the end plate 2, and carrying upon such projecting ends the respective arms 19 and 20, as seen in Fig. 2. The shafts 17 and 18 are partially rotated at certain times during the cycle of operation of the machine, by means hereinafter described, to bring the arms 19 and 20 successively into contact with opposite ends of the double lever 14, and by so doing to rock the bucket supporting shaft 11 to first tilt the bucket 13 to dump the contents thereof, and then to restore said bucket to its original position.

Supported by a fixed bracket 21, Fig. 2, below the discharge lip 13' of each bucket 13 is a discharge hopper 22, having a neck 23, beneath which is placed a container, herein shown as a carton 24, which rests upon a lower fixed bracket 25. Thus when the bucket 13 is tilted by the arm 19, the material therein is dumped out into the chute 22, and passes down through the neck 23 thereof into the container 24.

Located centrally above the two buckets 13, (only one of which is shown in the drawings) is a swinging feed hopper or spout 26, Figs. 1 and 2, carried by a shaft 27 mounted for partial rotation in a bracket 28 extending upwardly from the frame of the machine.

Suitable means are provided for feeding material into the upper end of the swinging hopper or spout 26, as, for example, a feed trough 29, Fig. 2. The shaft 27 has fixed thereto a depending lever arm 30, which carries a sliding extension 31, the lower end of which is formed with a central latch portion 32, Fig. 1, and two opposite lateral wings 33. A spring 34 normally retains said extension 31 in its lowermost position.

A spring 35 connects a lug 36 on the arm 30 with the upper end of a swinging lever arm 37, mounted upon a rock-shaft 38 suitably journaled in a bracket 39 carried by the frame of the machine, and said shaft is actuated by the engagement of a cam groove 40 with a stud 41 carried by a short arm 42 upon said rock-shaft 38. The hopper or spout 26 is rocked from side to side, to direct the material flowing therethrough successively into one and the other of the buckets 13, upon the release of the latch 32 by means hereinafter described, by the tension of the spring 35, which is alternately maintained, first in one direction and then in the other, by the swinging lever 37. This rocking of the feed spout 26 is for the purpose of diverting the flow of material from one bucket to the other when the weight of the material in the first bucket reaches a certain predetermined value. Two oppositely disposed sets of mechanism, one associated with and controlled by each weighing bucket, are provided, and since both of said sets are similar, a description of one will suffice.

A transverse drive shaft 43, suitably journaled in the end plates 2, is continuously rotated by power applied, in the present instance, through a driving gear 44, Fig. 1. Upon this shaft 43 are carried the operating mechanisms, each comprising the following:—A collar 45, Figs. 3 to 7, is keyed to the shaft 43, and has fixed upon it, as by means of cap screws 46, an annular ring 47 provided with external teeth 48 and internal teeth 49. A sleeve 50, common to both sets of mechanism, is rotatably mounted upon the shaft 43 adjacent to the ring 47, and carries a pawl 51 normally pressed by a spring 52 into engagement with the internal teeth 49 of said ring 47. Mounted freely outside of said sleeve 50 adjacent to said ring 47 and to each other, are two plates 53 and 54, each formed at its lower portion with an ear 55, Figs. 3 and 6, (only one of which is shown in the drawings), which is connected by a spring 56 with a fixed plate 57 carried by the frame of the machine. An adjustable stop 58 is provided to limit the rotation of said plates 53 and 54 in the direction in which they are moved by said springs 56. The plate 53 carries a lug 59, projecting slightly beyond the outer tooth diameter of the ring 47, and formed with a hooked end 60. The plate 54 carries a trigger 61, adapted to engage both the external teeth 48 of the ring 47 and the hooked end 60 of the lug 59 carried by the plate 53, but normally held out of such engagement by the abutment of its rear end 62 against an arm 63, as seen in Fig. 3. This arm 63 is carried, as shown in Fig. 2, by a plate 64 extending from and supported by the member 8 of the weighing balance, so that when said balance is depressed by the weight of material in the bucket 13, the arm 63 is lowered away from the trigger 61, which thereupon falls into engagement with one of the teeth 48 of the continuously rotating ring 47, and the lug 59, as seen in Fig. 6. Both plates 53 and 54 are, therefore, rotated, in the direction of the arrows in Figs. 3 and 6, until the heel 65 of the trigger 61 comes into contact with an adjustable stop 66, as shown in Fig. 6. At this point a latch 67 drops under a shoulder 68 on the periphery of the plate 54, and immediately thereafter the trigger 61 is tripped by the stop 66. This allows the plate 53 to be returned by its spring 56 to its original position, but the plate 54 is held in its advanced position, as in Fig. 6, by the latch 67.

The sleeve 50, as before stated, is common to both sets of mechanism, and carries at its center the groove cam 40, and on either side thereof a member 69, one of which is shown particularly in Figs. 4, 5 and 7, and which is formed with an eccentric cam 70, a rim 71 having an opening 72 therein, and a concentric surface 73. A set-screw 74 is shown in Fig. 7 for fixing said member 69 upon said sleeve 50. The rim 71 engages the finger 32 of the sliding spring retained latch 31 carried by the arm 30, to retain said arm 30 and the feed spout 26 in position after the arm 37 has been moved to the other side by the cam groove 40 as hereinafter described. In this position of the arm 30, shown in Figs. 1 and 2, one of the wings 33 of the latch 31 lies within and projects through a notch 75, Figs. 3 and 6, cut in the fixed plate 57. The partial rotation of the plate 54, described above, causes a cam surface 76 on the upper edge of said plate 54 to engage with said wing 33 projecting through the notch 75 to lift the latch 31 clear of the rim 71, whereupon the tension of the spring 35 moves the arm 30 and the feed spout 26 to the other side, when the finger 32 of said latch 31 passes through the properly positioned opening 72 in the rim 71 of the second member 69, and is at once engaged and held by the complete portion of said rim.

Two opposite radial slots 77, Figs. 3, 6 and 7, are formed in each fixed plate 57, and in said slots are slidably mounted trip-blocks 78, provided with laterally projecting pins 79 adapted to engage and follow eccentric slots 80 cut in the movable plate 54. The inner ends of these trip-blocks 78 are adapted to engage the pawl 51, at each half-revolution of the sleeve 50, in such manner that when said trip-blocks 78 are in their innermost position, as in Fig. 3, the pawl 51 is forced out of engagement with the internal teeth 49 of the continuously rotating ring 47, and when said blocks are in their outermost position, as in Fig. 6, said pawl is allowed to engage said teeth. It will be seen, from Fig. 7, that the pawl 51 is of sufficient width to engage both the teeth 49 and the trip-block 78.

Arranged in the path of travel of the cam 70 are three fingers, 81, 82, and 83, Figs. 3, 4, 5 and 6. The finger 81 is mounted upon the shaft 17, upon the outer end of which is carried the arm 19, Fig. 2, for tilting the bucket 13, as described above. The finger 82 is mounted upon the shaft 18, which rights said bucket by means of the arm 20. The finger 83 actuates the latch 67, as shown in Fig. 4, by means of a short shaft 84. Springs 85, Fig. 1, are provided for retaining the several fingers in their respective normal, or inoperative positions. A band 86 encircles the concentric drum 73, and is held by a screw 87 to act as a brake to prevent over-running of the cam block 69 after the pawl 51 is disengaged.

The cycle of operation of the machine may be briefly outlined as follows:—Assuming the parts to be in the positions shown in Figs. 1, 2 and 3 of the drawings, material is introduced into the feed-spout 26 and guided thereby into the right-hand bucket 13. When the weight of this material in said bucket is sufficient to tip the scale beam 3, the trigger 61, released by the arm 63, engages the teeth 48 of the continuously rotating member 47 and it also engages the lug 59 of the plate 53, as shown in Fig. 6, and thereupon both plates 53 and 54 are rotated to the limit of their movement. This movement of the plate 54 immediately releases the arm 30, by means of the cam edge 76 of said plate, which acting under the wing 33 of the latch 31, lifts said latch so that its finger 32 clears the holding rim 71, and the feed-spout 26 is thereupon swung to the opposite side by the tension of the spring 35. The flow of material is thus diverted into the left-hand bucket, not illustrated, without being interrupted. A baffle 88, seen in Fig. 1, is provided to prevent spilling of the material between the buckets. The movement of the plate 54 also raises, by means of its slots 80, the trip-blocks 78, as shown in Fig. 6, so that the pawl 51 is allowed to engage the internal teeth 49 of the continuously rotating member 47, thus imparting rotary movement to the sleeve 50, which carries said pawl 51, and which sleeve, as before stated, is common to both sets of mechanism, and carries both cam members 69 and the single cam groove 40 therebetween. The rotation of said sleeve first causes the rim 71 of the left-hand mechanism, illustrated in Fig. 1, to lock the arm 30, by engagement with the finger 32 of the latch 31 of said arm, and thereby lock the feed-spout 26, in its left-hand position; and thereafter the cam groove 40 moves the arm 37 to its right-hand position, to place the spring 35 again under tension in the opposite direction. The rotation of the sleeve 50 also causes the cam 70 of the right-hand mechanism to actuate first the finger 81, which, by means of the shaft 17 and the arm 19, tilts the bucket 13 to dump the contents thereof into the discharge hopper 22, whence it falls into the container 24; second to actuate the finger 82, which rights the bucket 13 by means of the shaft 18 and the arm 20; and finally, by means of the finger 83, to trip the latch 67 to allow the plate 54 to be returned by its spring, not shown in the drawings, to its original position, as in Fig. 3. During this return movement of the plate 54, the trigger 61 rides upon the lug 59 of the plate 53, which, as described above, has previously been returned to its original position, so that said trigger 61 cannot engage the teeth 48 between the time it leaves the stop 66 and the engagement of its outer end 62 with the arm 63, by which arm 63 said trigger 61 is held out of engagement until the bucket 13 is again filled. The return of the plate 54 moves the trip-blocks 78 inwardly, so that the pawl 51, which is now advanced 180 degrees from its original position, rides upon the lower of said blocks 78 and is thereby thrown out of engagement with the teeth 49. The sleeve 50, with its associated devices, thereupon comes to a stop after a half-revolution, which movement brings the left-hand mechanism into position to perform a similar cycle of operations upon the left-hand bucket, not illustrated, when said left-hand bucket receives sufficient material to tip its scale beam. Thus the two sets of mechanism are alternately thrown into and out of operation by the weight of a predetermined amount of material in their respective buckets, and the flow of material through the feed-spout 26 is automatically diverted alternately into the two buckets without being interrupted.

Our machine may be modified and simplified by the omission of the weighing buckets 13 as intermediate receivers. In such case the feed will be directly into the cartons or containers themselves, which will be placed upon the scales in position to be served successively from the adjustable feed spout, and said containers thus acting as immediate receivers will by the predetermined weight supplied to them influence or effect, through the movement of the scale-beams, the mechanism heretofore described which controls the feed-spout adjustment. We have illustrated this modification sufficiently in Fig. 8, in which a frame or cage 25' on the scale beam 3, conveniently receives and holds a carton 24, into which the feed-spout 26, swinging about its shaft 27, is adapted to deliver the material directly.

We claim:—

1. A weighing-machine comprising movable delivery means; plural weighing-scales; a receiver on each scale; a power device for moving said delivery means into relation with said receivers successively; and means actuated by a predetermined weight of the material delivered to the receivers for throwing said power device into and out of action.

2. A weighing-machine comprising movable delivery means; plural weighing-scales; a receiver on each scale; a rotatable power shaft; and means actuated by the movement of the scales under a predetermined weight of material delivered to the receivers for throwing the power shaft into action to move the delivery means into relation with said receivers successively.

3. A weighing-machine comprising movable delivery means; plural weighing-scales; a receiver on each scale; a power device for moving said delivery means into relation with said receivers successively and holding it in each of said relations until a predetermined weight of delivered material is attained; and means actuated by such predetermined weight for throwing said power device into and out of action.

4. A weighing-machine comprising movable delivery means; plural weighing-scales; a receiver on each scale; a rotatable power shaft; and means actuated by the movement of the scales under a predetermined weight of material delivered to one receiver for throwing the power shaft into action to move said delivery means into relation with another receiver, holding it there until said predetermined weight is attained, releasing it thereupon, and moving it again into relation with the first receiver.

5. A weighing-machine comprising movable delivery means; plural weighing-scales; a weighing bucket on each scale; a power device for moving the delivery means into relation with said buckets successively and dumping them when a predetermined weight of delivered material has been attained; and means actuated by said predetermined weight for throwing the power device into and out of action.

6. A weighing-machine comprising movable delivery means; plural weighing-scales; a weighing bucket on each scale; a rotatable power shaft; and means actuated by the movement of each scale under a predetermined weight of material delivered to each bucket for throwing the power shaft into action to dump said buckets successively and to move the delivery means into relation with said buckets successively.

7. A weighing-machine comprising a movable delivery means; dual weighing-scales; a weighing bucket on each scale; means actuated by a predetermined weight of material delivered to one bucket for moving the delivery means into relation with the other bucket, dumping said first bucket, and holding the delivery means in relation with the other bucket until the predetermined weight is attained; and means actuated by a predetermined weight of material delivered to the other bucket for releasing the delivery means, moving it back to the first bucket, dumping said other bucket, and holding the delivery means in relation with the first bucket until the predetermined weight is attained.

8. A weighing-machine comprising a swinging delivery spout; a dual weighing-scale; a tiltable weighing bucket on each scale; means for automatically swinging said delivery spout into relation with said weighing buckets successively; and means for automatically tilting said buckets to dump their contents and to upright them again successively.

9. A weighing-machine comprising a swinging delivery-spout; a dual weighing scale; a tiltable weighing bucket on each scale; means actuated by a predetermined weight of material delivered to the buckets to swing the delivery spout into relation with each bucket successively; and means actuated by said predetermined weight in each bucket to tilt and upright them successively.

10. A weighing-machine comprising a swinging delivery-spout; a dual weighing scale; a tiltable weighing bucket on each scale; a rotatable power shaft; and means actuated by the movement of each scale under a predetermined weight of material delivered to each bucket for throwing the power shaft into action to swing the delivery spout into relation with each bucket successively, and to tilt and upright said buckets successively.

11. A weighing-machine comprising a swinging delivery-spout; a dual weighing scale; a tiltable weighing bucket on each scale; means actuated by a predetermined weight of material delivered to one bucket for swinging the delivery spout into relation with the other bucket, tilting and uprighting said first bucket, and holding the delivery spout in relation with the other bucket until the predetermined weight is attained; and means actuated by a predetermined weight of material delivered to the other bucket for releasing the delivery spout, swinging it back to the first bucket, tilting and uprighting said other bucket, and holding said delivery spout in relation with the first bucket until the predetermined weight is attained.

In testimony whereof we have signed our names to this specification in the presence of two subscribing witnesses.

WILLIAM C. ANDERSON.
ALBERT R. THOMPSON.

Witnesses:
  Wm. F. Booth,
  D. B. Richards.

Copies of this patent may be obtained for five cents each, by addressing the "Commissioner of Patents, Washington, D. C."